US007112295B1

(12) United States Patent
Haataja

(10) Patent No.: US 7,112,295 B1
(45) Date of Patent: Sep. 26, 2006

(54) METHOD FOR SIMULTANEOUSLY MOLDING AND SHEARING MULTIPLE WOOD STRAND MOLDED PARTS

(75) Inventor: Bruce A. Haataja, Lake Linden, MI (US)

(73) Assignee: GFP Strandwood Corp., Hancock, MI (US)

( * ) Notice: Subject to any disclaimer, the term of this patent is extended or adjusted under 35 U.S.C. 154(b) by 332 days.

(21) Appl. No.: 10/415,876

(22) PCT Filed: Nov. 3, 2000

(86) PCT No.: PCT/US00/30313

§ 371 (c)(1),
(2), (4) Date: May 2, 2003

(87) PCT Pub. No.: WO02/36316

PCT Pub. Date: May 10, 2002

(51) Int. Cl.
*B29C 37/00* (2006.01)
*B28B 11/12* (2006.01)
*B28B 7/14* (2006.01)

(52) U.S. Cl. ...................... 264/157; 254/160; 254/163; 425/310

(58) Field of Classification Search ................ 269/157, 269/160, 161, 163; 425/310
See application file for complete search history.

(56) References Cited

U.S. PATENT DOCUMENTS 3,164,511 A 1/1965 Elmendorf
3,238,281 A 3/1966 Kato
3,354,248 A 11/1967 Haas et al.
4,131,705 A 12/1978 Kubinsky
4,147,014 A * 4/1979 Tashiro et al. ................ 53/559
4,213,928 A 7/1980 Casselbrant
4,241,133 A 12/1980 Lund et al.
4,246,310 A 1/1981 Hunt et al.
4,248,163 A 2/1981 Caughey
4,248,820 A 2/1981 Haataja
4,337,710 A 7/1982 Haataja et al.
4,384,019 A 5/1983 Haataja
4,408,544 A 10/1983 Haataja
4,440,708 A 4/1984 Haataja et al.
4,469,216 A 9/1984 Haataja et al.
4,790,966 A 12/1988 Sandberg et al.
4,960,553 A 10/1990 DeBruine et al.

* cited by examiner

*Primary Examiner*—Stephen J. Lechert, Jr.
(74) *Attorney, Agent, or Firm*—Price, Heneveld, Cooper, DeWitt & Litton, LLP

(57) ABSTRACT

A multiple cavity (30*a*, 30*b*) mold die (10) and method for molding binder coated wood flakes (12) into multiple three dimensionally curved wood strand parts. Vertical walls (28, 32) shear a felted mat (11) of binder coated wood flakes as the mold is closed.

11 Claims, 2 Drawing Sheets

METHOD FOR SIMULTANEOUSLY MOLDING AND SHEARING MULTIPLE WOOD STRAND MOLDED PARTS

BACKGROUND OF THE INVENTION

A. Field of the Invention

The present invention relates to wood flake molding.

B. Background of the Art

Wood flake molding, also referred to as wood strand molding, is a technique invented by wood scientists at Michigan Technological University during the latter part of the 1970s for molding three-dimensionally configured objects out of binder coated wood flakes having an average length of about 1¼ to about 6 inches, preferably about 2 to about 3 inches; an average thickness of about 0.005 to about 0.075 inches, preferably about 0.015 to about 0.030 inches; and an average width of 3 inches or less, most typically 0.25 to 1.0 inches, and never greater than the average length of the flakes. These flakes are sometimes referred to in the art as "wood strands." This technology is not to be confused with oriented strand board technology (see e.g., U.S. Pat. No. 3,164,511 to Elmendorf) wherein binder coated flakes or strands of wood are pressed into planar objects. In wood flake or wood strand molding, the flakes are molded into three-dimensional, i.e. non-planar, configurations.

In wood flake molding, flakes of wood having the dimensions outlined above are coated with MDI or similar binder and deposited onto a metal tray having one open side, in a loosely felted mat, to a thickness eight or nine times the desired thickness of the final part. The loosely felted mat is then covered with another metal tray, and the covered metal tray is used to carry the mat to a mold. (The terms "mold" and "die," as well as "mold die," are sometimes used interchangeably herein, reflecting the fact that "dies" are usually associated with stamping, and "molds" are associated with plastic molding, and molding of wood strands does not fit into either category.) The top metal tray is removed, and the bottom metal tray is then slid out from underneath the mat, to leave the loosely felted mat in position on the bottom half of the mold. The top half of the mold is then used to press the mat into the bottom half of the mold at a pressure of approximately 600 psi, and at an elevated temperature, to "set" (polymerize) the MDI binder, and to compress and adhere the compressed wood flakes into a final three-dimensional molded part. The excess perimeter of the loosely felted mat, that is, the portion extending beyond the mold cavity perimeter, is pinched off where the part defining the perimeter of the upper mold engages the part defining perimeter of the lower mold cavity. This is sometimes referred to as the pinch trim edge.

U.S. Pat. Nos. 4,440,708 and 4,469,216 disclose this technology. The drawings in U.S. Pat. No. 4,469,216 best illustrate the manner in which the wood flakes are deposited to form a loosely felted mat, though the metal trays are not shown. By loosely felted, it is meant that the wood flakes are simply lying one on top of the other in overlapping and interleaving fashion, without being bound together in any way. The binder coating is quite dry to the touch, such that there is no stickiness or adherence which hold them together in the loosely felted mat. The drawings of U.S. Pat. No. 4,440,708 best illustrate the manner in which a loosely felted mat is compressed by the mold halves into a three-dimensionally configured article (see FIGS. 2–7, for example).

This is a different molding process as compared to a molding process one typically thinks of, in which some type of molten, semi-molten or other liquid material flows into and around mold parts. Wood flakes are not molten, are not contained in any type of molten or liquid carrier, and do not "flow" in any ordinary sense of the word. Hence, those of ordinary skill in the art do not equate wood flake or wood strand molding with conventional molding techniques.

One limitation heretofore associated with this technology has been that when the mold dies are closed, the edge portion of the mat projects from the mold cavity, at the perimeter of the formed part. This scrap must be removed, and the part must be cleared up at the edge. This perimeter scrap also makes it difficult to mold more than one part in a single mold, because unless it projects from the mold, it makes it difficult to close the mold and develop appropriate pressure on the parts in the mold. This results in molding multiple parts in separate molds, wasting materials and time.

SUMMARY OF THE INVENTION

In the present invention, it has been surprisingly discovered that multiple molded wood strand products can be produced in the same mold, by locating two mold cavities directly adjacent each other, but separating them vertically from one another, rather than by a wall between them. Perimeter scrap between the two parts is substantially eliminated by the shearing action of the closing mold, at the generally vertical wall extending from the bottom of one cavity to the top of the next. Thus, multiple parts can be made in the same mold and easily and efficiently separated.

These and other features, advantages and objects of the present invention will be further understood and appreciated by those skilled in the art by reference to the following specification and claims.

DETAILED DESCRIPTION OF THE PREFERRED EMBODIMENTS

Figure 1:
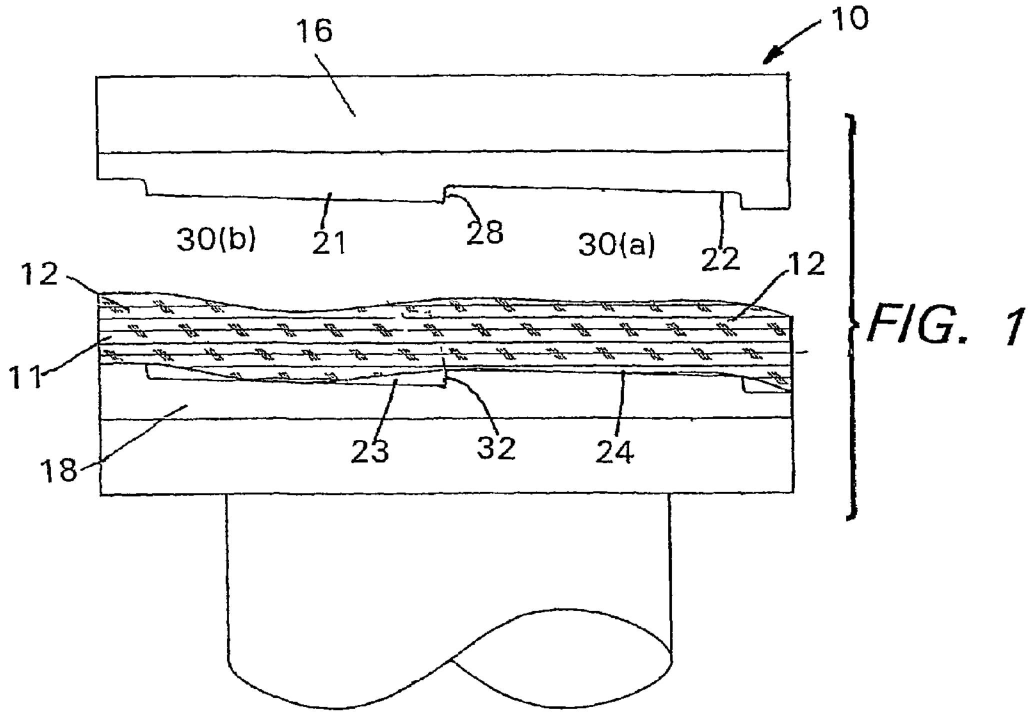
FIG. 1 is a side elevational cross-sectional view of the spaced upper and lower mold halves with a loosely felted mat of wood flakes positioned therebetween.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
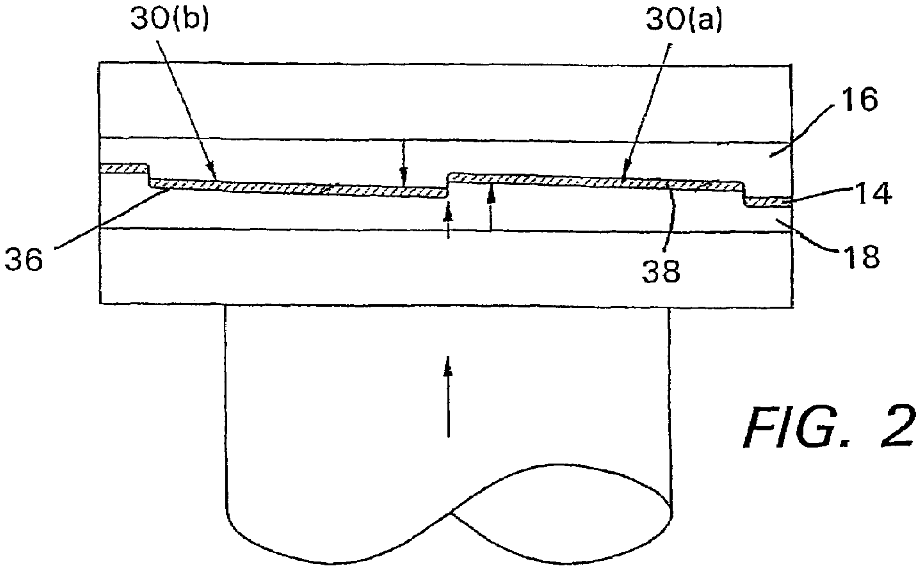
FIG. 2 is the same view of FIG. 1 with the mold closed, whereby the wood flakes are consolidated, compressed, cured, and sheared under heat and pressure to form multiple molded wood flake parts.

The reference number 10 (FIG. 1) generally designates a mold of the present invention. The mold 10 is used in a method of forming a loosely felted mat 11 of wood flakes 12 into a molded wood flake part(s) 14 (FIG. 2). The mold 10 includes a top mold die 16 and a bottom mold die 18. As can be seen from FIG. 1, and especially FIG. 2, mold die halves 16 and 18 form two mold cavities, 30(*a*) and 30(*b*), therebetween. The surface of upper die 16 includes a recessed surface 22 defining the female half of cavity 30(*a*). Upper die 16 includes a projecting surface 21 immediately adjacent recessed surface 22, separated by a generally vertical wall 28 therefrom, which defines the male half of mold cavity 30(*b*).

Similarly, bottom mold die 18 includes a projecting surface 24 which defines the female half of mold cavity 30(*a*), and an immediately adjacent recessed surface 23 which defines the female half of mold cavity 30(*b*). The projecting surface 24 and the recessed surface 23 are separated by a generally vertical wall 32.

In the illustrated example, the molded wood flake parts 14 are made by positioning a loosely felted mat 11 of wood flakes 12 on the bottom mold die 18 (FIG. 1). The top mold die 16 and the bottom mold die 18 are then brought together (FIG. 2) and heat and pressure are applied to the felted mat 11. The felted mat 11 is thereby compressed and cured into the molded wood flake part(s) 14.

As can be seen especially in FIG. 2, mold cavities 30(*a*) and 30(*d*) are separated from each other vertically, rather than by a wall positioned between the adjacent cavities. As the mold is closed, upper generally vertical wall 28 engages lower generally vertical wall 32 to thereby shear the felted mat 11 at the juncture of the upper mold cavity 30(*a*) and the lower mold cavity 30(*b*). In this way, felted mat 11 is not only compressed so as to form parts 36 and 38, but also is sheared between parts 36 and 38, to eliminate any scrap or flashing along the adjacent edges of parts 36 and 38.

Figure 3:
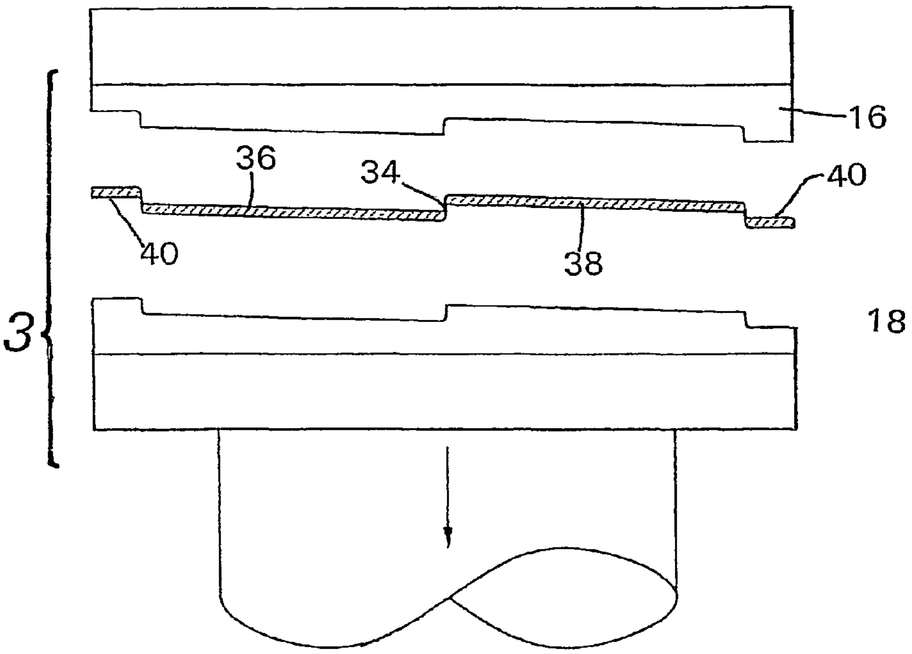
FIG. 3 is a side elevational view of the mold apparatus with the mold reopened and the parts removed.
Figure 4:
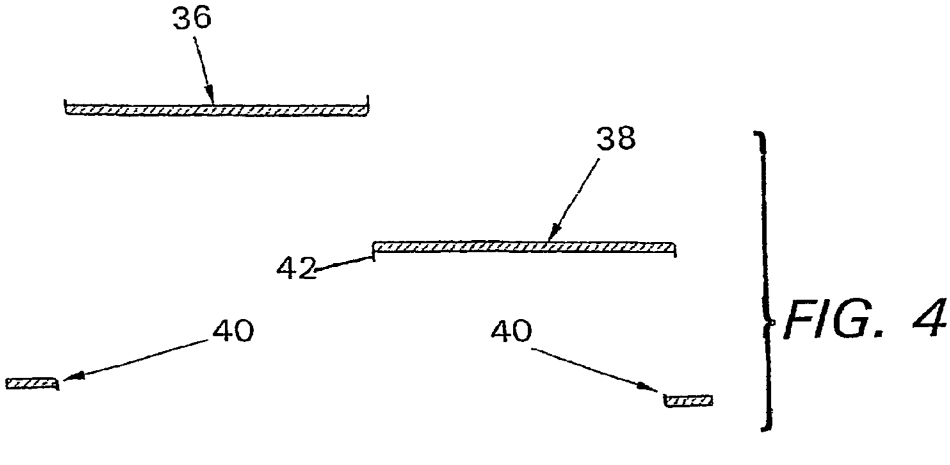
FIG. 4 is a side view of the parts as separated, once removed from the mold, with the flashing being removed.

Engaging walls 28 and 32 are referred to as "generally vertical," but would typically have a slight draft angle to a vertical line of 2 or 3° in order to insure proper closing and opening of the mold. Further, while scrap or flashing between parts 36 and 38 is substantially eliminated, it is probable that some edge dressing will have to be done along the adjacent edges of parts 36 and 38. As can be seen in FIG. 3, there will be a small amount of scrap or flashing 34 connecting parts 36 and 38 when mold halves 16 and 18 are separated to open the mold. Mold parts 36 and 38 readily separate from one another, and any remaining burr at 34 can be trimmed or sanded clean.

The left-hand part 36 and the right-hand part 38 will have flashing 40 on the outer edge of the respective pieces (FIG. 3). Once the left-hand part 36 is sheared from the right-hand part 38, any excess 42 formed from separating the left-hand 36 and right-hand 38 parts can be removed. Additionally, the flashing 40 is to be removed from the left-hand 36 and right-hand parts 38.

The wood flakes 12 used in creating the molded wood flake part(s) 14 can be prepared from various species of suitable hardwoods and softwoods used in the manufacture of particleboard. Representative examples of suitable woods include aspen, maple, oak, elm, balsam fir, pine, cedar, spruce, locust, beech, birch and mixtures thereof. Aspen is preferred.

Suitable wood flakes 12 can be prepared by various conventional techniques. Pulpwood grade logs, or so-called round wood, are converted into wood flakes 12 in one operation with a conventional roundwood flaker. Logging residue or the total tree is first cut into fingerlings in the order of 2–6 inches long with a conventional device, such as the helical comminuting shear disclosed in U.S. Pat. No. 4,053,004, and the fingerlings are flaked in a conventional ring-type flaker. Roundwood wood flakes 12 generally are higher quality and produce stronger parts because the lengths and thickness can be more accurately controlled. Also, roundwood wood flakes 12 tend to be somewhat flatter, which facilitates more efficient blending and the logs can be debarked prior to flaking which reduces the amount of less desirable fines produced during flaking and handling. Acceptable wood flakes 12 can be prepared by ring flaking fingerlings and this technique is more readily adaptable to accept wood in poorer form, thereby permitting more complete utilization of certain types of residue and surplus woods.

Irrespective of the particular technique employed for preparing the wood flakes 12, the size distribution of the wood flakes 12 is quite important, particularly the length and thickness. The wood flakes should have an average length of about 1¼ inch to about 6 inches and an average thickness of about 0.005 to about 0.075 inches. The average length of the wood flakes is preferably about 2 to about 3 inches. In any given batch, some of the wood flakes 12 can be shorter than 1¼ inch, and some can be longer than 6 inches, so long as the overall average length is within the above range. The same is true for the thickness.

The presence of major quantities of wood flakes 12 having a length shorter than about 1¼ inch tends to cause the felted mat 11 to pull apart during the molding step. The presence of some fines in the felted mat 11 produces a smoother surface and, thus, may be desirable for some applications so long as the majority of the wood flakes, preferably at least 75%, is longer than 1⅛ inch and the overall average length is at least 1¼ inch.

Substantial quantities of wood flakes 12 having a thickness of less than about 0.005 inches should be avoided, because excessive amounts of binder are required to obtain adequate bonding. On the other hand, wood flakes 12 having a thickness greater than about 0.075 inch are relatively stiff and tend to overlie each other at some incline when formed into the felted mat 11. Consequently, excessively high mold pressures are required to compress the wood flakes 12 into the desired intimate contact with each other. For wood flakes 12 having a thickness falling within the above range, thinner ones produce a smoother surface while thick ones require less binder. These two factors are balanced against each other for selecting the best average thickness for any particular application. The average thickness of the wood flakes 12 preferably is about 0.015 to about 0.25 inches, and more preferably about 0.0020 inch.

The width of the wood flakes 12 is less important. The wood flakes 12 should be wide enough to ensure that they lie substantially flat when felted during mat formation. The average width generally should be about 3 inches or less and no greater than the average length. For best results, the majority of the wood flakes 12 should have a width of about 1/16-inch to about 3 inches, and preferably 0.25 to 1.0 inches.

The blade setting on a flaker can primarily control the thickness of the wood flakes 12. The length and width of the wood flakes 12 are also controlled to a large degree by the flaking operation. For example, when the wood flakes 12 are being prepared by ring flaking fingerlings, the length of the fingerlings generally sets the maximum lengths. Other factors, such as the moisture content of the wood and the amount of bark on the wood affect the amount of fines produced during flaking. Dry wood is more brittle and tends to produce more fines. Bark has a tendency to more readily break down into fines during flaking and subsequent handling than wood.

While the flake size can be controlled to a large degree during the flaking operation as described above, it usually is necessary to use some sort of classification in order to remove undesired particles, both undersized and oversized, and thereby ensure the average length, thickness and width of the wood flakes 12 are within the desired ranges. When roundwood flaking is used, both screen and air classification usually are required to adequately remove both the undersize and oversize particles, whereas fingerling wood flakes 12 usually can be properly sized with only screen classification.

Wood flakes 12 from some green wood can contain up to 90% moisture. The moisture content of the mat must be substantially less for molding as discussed below. Also, wet wood flakes 12 tend to stick together and complicate classification and handling prior to blending. Accordingly, the wood flakes 12 are preferably dried prior to classification in a conventional type drier, such as a tunnel drier, to the moisture content desired for the blending step. The moisture content to which the wood flakes 12 are dried usually is in the order of about 6 weight percent or less, preferably about 2 to about 5 weight percent, based on the dry weight of the wood flakes 12. If desired, the wood flakes 12 can be dried to a moisture content in the order of 10 to 25 weight percent prior to classification and then dried to the desired moisture content for blending after classification. This two-step drying may reduce the overall energy requirements for drying wood flakes 12 prepared from green woods in a manner producing substantial quantities of particles which must be removed during classification and, thus, need not be as thoroughly dried.

To coat the wood flakes 12 prior to being placed as a felted mat 11 within the cavity 30 within the mold 10, a known amount of the dried, classified wood flakes 12 is introduced into a conventional blender, such as a paddle-type batch blender, wherein predetermined amounts of a resinous particle binder, and optionally a wax and other additives, is applied to the wood flakes 12 as they are tumbled or agitated in the blender. Suitable binders include those used in the manufacture of particleboard and similar pressed fibrous products and, thus, are referred to herein as "resinous particle board binders" Representative examples of suitable binders include thermosetting resins such as phenolformaldehyde, resorcinol-formaldehyde, melamine-formaldehyde, urea-formaldehyde, urea-furfuryl and condensed furfuryl alcohol resins, and organic polyisocyanates, either alone or combined with urea- or melamine-formaldehyde resins.

Particularly suitable polyisocyanates are those containing at least two active isocyanate groups per molecule, including diphenylmethane diisocyanates, m- and p-phenylene diisocyanates, chlorophenylene diisocyanates, toluene di- and triisocyanates, triphenylmethane triisocyanates, diphenylether-2,4,4'-triisocyanate and polyphenylpolyisocyanates, particularly diphenylmethane-4,4'-diisocyanate. So-called MDI is particularly preferred.

The amount of binder added to the wood flakes 12 during the blending step depends primarily upon the specific binder used, size, moisture content and type of the wood flakes 12, and the desired characteristics of the part being formed. Generally, the amount of binder added to the wood flakes 12 is about 2 to about 15 weight percent, preferably about 4 to about 10 weight percent, as solids based on the dry weight of the wood flakes 12. When a polyisocyanate is used alone or in combination with a urea-formaldehyde resin, the amounts can be more toward the lower ends of these ranges.

The binder can be admixed with the wood flakes 12 in either dry or liquid form. To maximize coverage of the wood flakes 12, the binder preferably is applied by spraying droplets of the binder in liquid form onto the wood flakes 12 as they are being tumbled or agitated in the blender. When polyisocyanates are used, a conventional mold release agent preferably is applied to the die or to the surface of the felted mat prior to pressing. To improve water resistance of the part, a conventional liquid wax emulsion preferably is also sprayed on the wood flakes 12 during the blending step. The amount of wax added generally is about 0.5 to about 2 weight percent, as solids based on the dry weight of the wood flakes 12. Other additives, such as at least one of the following: a coloring agent, fire retardant, insecticide, fungicide, mixtures thereof and the like may also be added to the wood flake 12 during the blending step. The binder, wax and other additives, can be added separately in any sequence or in combined form.

The moistened mixture of binder, wax and wood flakes 12 or "furnish" from the blending step is formed into a loosely-felted, layered mat 11, which is placed within the cavity 30 prior to the molding and curing of the felted mat 11 into molded wood flake part(s) 14. The moisture content of the wood flakes 12 should be controlled within certain limits so as to obtain adequate coating by the binder during the blending step and to enhance binder curing and deformation of the wood flakes 12 during molding.

The presence of moisture in the wood flakes 12 facilitates their bending to make intimate contact with each other and enhances uniform heat transfer throughout the mat during the molding step, thereby ensuring uniform curing. However, excessive amounts of water tend to degrade some binders, particularly urea-formaldehyde resins, and generate steam which can cause blisters. On the other hand, if the wood flakes 12 are too dry, they tend to absorb excessive amounts of the binder, leaving an insufficient amount on the surface to obtain good bonding and the surfaces tend to cause hardening which inhibits the desired chemical reaction between the binder and cellulose in the wood. This latter condition is particularly true for polyisocyanate binders.

Generally, the moisture content of the furnish after completion of blending, including the original moisture content of the wood flakes 12 and the moisture added during blending with the binder, wax and other additives, should be about 5 to about 25 weight percent, preferably about 8 to about 12 weight percent. Generally, higher moisture contents with these ranges can be used for polyisocyanate binders because they do not produce condensation products upon reacting with cellulose in the wood.

The furnish is formed into the generally flat, loosely felted, mat 11, preferably as multiple layers. A conventional dispensing system, similar to those disclosed in U.S. Pat. Nos. 3,391,223, 3,824,058, and 4,469,216, can be used to form the felted mat 11. Generally, such a dispensing system includes trays, each having one open side, carried on an endless belt or conveyor and one or more (e.g., three) hoppers spaced above and along the belt in the direction of travel for receiving the furnish.

When a multi-layered felted mat 11 is formed, a plurality of hoppers usually are used with each having a dispensing or forming head extending across the width of the carriage for successively depositing a separate layer of the furnish as the tray is moved beneath the forming heads. Following this, the tray is taken to the mold to place the felted mat within the cavity of bottom mold, by sliding the tray out from under the mat.

In order to produce molded wood flake part(s) 14 having the desired edge density characteristics without excessive blistering and springback, the felted mat should preferably have a substantially uniform thickness and the wood flakes 12 should lie substantially flat in a horizontal plane parallel to the surface of the carriage and be randomly oriented relative to each other in that plane. The uniformity of the mat thickness can be controlled by depositing two or more layers of the furnish on the carriage and metering the flow of furnish from the forming heads.

Spacing the forming heads above the carriage so the wood flakes 12 must drop about 1 to about 3 feet from the heads en route to the carriage can enhance the desired random orientation of the wood flakes 12. As the flat wood flakes 12 fall from that height, they tend to spiral downwardly and land generally flat in a random pattern. Wider wood flakes 12 within the range discussed above enhance this action. A scalper or similar device spaced above the carriage can be used to ensure uniform thickness or depth of the mat, however, such means usually tend to align the top layer of wood flakes 12, i.e. eliminate the desired random orientation. Accordingly, the thickness of the mat that would optimally have the nominal part thickness 100 preferably controlled by closely metering the flow of furnish from the forming heads. The mat thickness that would optimally have the nominal part thickness 100 used will vary depending upon such facts as the size and shape of the wood flakes 12, the particular technique used for forming the mat 11, the desired thickness and density of the molded wood flake part(s) 14 produced, the configuration of the molded wood flake part(s) 14, and the molding pressure to be used.

Following the production of the felted mat 11 and placement of the felted mat 11 within the cavity 30 of the mold 10, the felted mat 11 is compressed and cured under heat and pressure when the top mold die 16 engages the bottom mold die 18.

The felted mat 11 is then compressed and cured between the top mold die 16 and the bottom mold 18 to become the molded wood flake part(s) 14. After the molded wood flake part(s) 14 is produced by the method of the present invention, any flashing is removed by conventional means.

The resulting left-hand part 36 and right-hand part 38 are formed into one mold 10 comprising the top mold die 16 and the bottom mold die 18. The raised 21 and lower 22 portions of the surface 20 of the top mold die 16, separated by the generally vertical wall 28, shear the left 36 and right 38 parts by compression with the raised portion 24 and lower portion 23, separated by generally vertical wall 32, of the surface 26 of the bottom mold die 18.

The above description is that of the preferred embodiment only. Modifications of the invention will occur to those skilled in the art and to those who make or use the invention. Therefore, it is understood that the embodiment described above is merely for illustrative purposes and not intended to limit the scope of the invention, which is defined by the following claims as interpreted according to the principles of patent law, including the doctrine of equivalents.

The invention claimed is:

1. A method of molding wood strand parts formed from binder coated wood flakes comprising:

forming a loosely felted mat of said wood flakes;

depositing said mat onto a lower mold die;

compressing and heating said mat between an upper mold die and said lower mold die, said upper and lower mold dies forming at least two cavities for forming at least two parts therebetween, said cavities being positioned adjacent one another, but being separated by a generally vertical wall extending from the bottom of the upper cavity to the top of the lower cavity, whereby as said upper and lower mold dies are brought together, said loosely felted mat of wood flakes is sheared at said generally vertical wall.

2. The method of claim 1, wherein said upper mold cavity is defined by a female cavity of said upper mold die and a corresponding male member on said lower mold die, and said lower mold cavity is defined by a projecting male member on said upper mold die and a corresponding female mold cavity of said lower mold die.

3. The method of claim 1, wherein said wood flakes have an average length of from about 1¼ to about 6.0 inches, an average thickness of from about 0.015 to about 0.25 inches, and an average width of less than the average length, and no greater than about 3.0 inches.

4. The method of claim 3, wherein said wood flakes of said mat have an average length of from about 2 to about 3 inches.

5. The method of claim 4, wherein said wood flakes of said mat have an average thickness of from about 0.015 to about 0.025 inches.

6. The method of claim 5, wherein said wood flakes of said mat have an average width of from about 0.25 to about 1.0 inches.

7. An apparatus for forming wood strand molded parts molded from a loosely felted mat of binder coated wood flakes having an average length of 1¼ to about 6 inches, an average thickness of about 0.005 to about 0.75 inches, and an average width of 3 inches or less, said average width never being greater than said average length of said flakes, comprising:

an upper mold die and a lower mold die;

said upper mold die and said lower mold die being configured to form multiple parts that are sheared apart when the mold is compressed;

wherein said upper and lower mold dies form at least two cavities for forming at least two parts therebetween, said cavities being positioned adjacent one another, but being separated by a generally vertical wall extending from the bottom of the upper cavity to the top of the lower cavity, whereby as said upper and lower mold dies are brought together, said loosely felted mat of wood flakes is sheared at said generally vertical wall.

8. The apparatus of claim 7, wherein said upper mold cavity is defined by a female cavity of said upper mold die and a corresponding male member on said lower mold die, and said lower mold cavity is defined by a projecting male member on said upper mold die and a corresponding female mold cavity of said lower mold die.

9. A process for forming wood strand molded parts comprising:

providing a loosely felted mat of binder coated wood flakes;

providing a mold comprising an upper mold die and a lower mold die;

positioning the loosely felted mat of binder coated wood flakes between the upper mold die and lower mold die;

compressing the loosely felted mat of binder coated wood flakes between the upper mold die and the lower mold die; and forming multiple parts that are sheared apart when the loosely felted mat of binder coated wood flakes is compressed between the upper mold die and the lower mold die.

10. The process for forming wood strand molded parts of claim 9, wherein:

the upper and lower mold dies form at least two cavities including an upper mold cavity and a lower mold cavity, said cavities being positioned adjacent oneanother, but being separated by a generally vertical wall extending from a bottom of the upper mold cavity to a top of the lower mold cavity, whereby as said upper and lower mold dies are brought together, said loosely felted mat of wood flakes is sheared at said generally vertical wall.

11. The process for forming wood strand molded parts of claim 10, wherein:

said upper mold cavity is defined by a female cavity of said upper mold die and a corresponding male member on said lower mold die, and said lower mold cavity is defined by a projecting male member on said upper mold die and a corresponding female mold cavity of said lower mold die.

* * * * *

UNITED STATES PATENT AND TRADEMARK OFFICE

CERTIFICATE OF CORRECTION

PATENT NO. : 7,112,295 B1 Page 1 of 1
APPLICATION NO. : 10/415876
DATED : September 26, 2006
INVENTOR(S) : Bruce A. Haataja It is certified that error appears in the above-identified patent and that said Letters Patent is hereby corrected as shown below:

Column 5
Line 39, “binders" ” should be --binders.” --.

Column 9
Lines 5-6, “onean-other” should be --one another--.

Signed and Sealed this

Twentieth Day of February, 2007

JON W. DUDAS
*Director of the United States Patent and Trademark Office*